METHOD OF IMPARTING ELECTRICAL CONDUCTIVITY TO AN AMORPHOUS SUBSTRATE BY ION IMPLANTATION, AND THE PRODUCT THEREOF
Filed Aug. 15, 1968
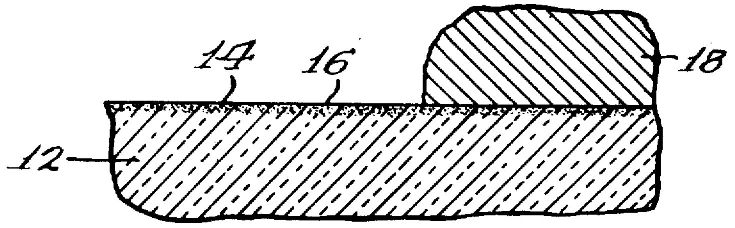
Inventor:
Nicholas D. Glyptis
By Hofgren, Wegner
Allen, Stellman & McCord Attys 3,682,700
Patented Aug. 8, 1972

3,682,700

METHOD OF IMPARTING ELECTRICAL CONDUCTIVITY TO AN AMORPHOUS SUBSTRATE BY ION IMPLANTATION, AND THE PRODUCT THEREOF

Nicholas D. Glyptis, Elmhurst, Ill., assignor to Gale Industries, Inc.

Continuation-in-part of application Ser. No. 675,551, Oct. 16, 1967. This application Aug. 15, 1968, Ser. No. 752,964
Int. Cl. H05b *33/28;* H01b *1/06*
U.S. Cl. 117—211 15 Claims

ABSTRACT OF THE DISCLOSURE

The method of imparting electrical conductivity to an amorphous, normally non-conducting, thermally plasticizable, solid substrate by ion implantation comprising molecularly exciting the substrate at a surface thereof to a molecularly plastic condition and applying to this excited substrate a composition containing inorganic electrically conducting particles of colloidal size and smaller with the result that the particles penetrate or implant the excited plastic substrate at the excited surface between the molecules thereof and impart electrical conductivity to the substrate, the conductivity being retained when the exciting of the solid substrate ceases, the composition comprising a carrier solid that is an inorganic compound of an element of one of Groups III, IV and V of the Periodic Table, an n-type impurity inorganic compound of an element that can exist in a valence state higher than that of the carrier element, and a p-type impurity inorganic compound of an element that can exist in a valence state lower than that of the carrier element, and the products resulting from these methods.

This invention is a continuation-in-part of my copending application Ser. No. 675,551, filed Oct. 16, 1967, now abandoned.

One of the features of this invention is to provide a method of imparting electrical conductivity to an amorphous solid in a zone at a surface thereof wherein certain specified ions are implanted in the molecularly excited substrate so that the electrical conductivity at a desired degree of resistivity is retained when the exciting of the solid ceases.

Another feature of the invention is to provide an improved product comprising an amorphous solid that is rendered electrically conducting by reason of implantation of certain ions.

Other features and advantages of the invention will be apparent from the following description of the invention and embodiments taken in conjunction with the accompanying drawings. Of the drawings:

FIG. 1 is a greatly enlarged schematic fragmentary illustration of an implanted substrate and article according to one form of the invention.

The method and product of this invention results in imparting electrical conductivity to an amorphous, normally nonconducting, thermally plasticizable solid substrate by ion implantation. The invention is important in that for the first time so far as applicant is aware such normally non-conducting amorphous solids as glass, ceramics and other supercooled liquids can now be made electrically conducting with desired resistivity including very low resistivity and without necessarily changing the appearance of the substrate.

Methods of making a crystal electrically conducting as a semi-conductor have not heretofore been possible with electrically non-conducting, non-crystalline (amorphous) substances such as glass, ceramics and other such solids. These amorphous solids have no crystal structure so that the atoms of such solid are not arranged in a regular pattern and the energy bands of the amorphous solids are all filled with electrons. There has thus heretofore been no way to make a semi-conductor from an amorphous body because there was no way to introduce other or foreign atoms in the structure since it is amorphous.

In order to overcome this difficulty the present invention gives electrical conductivity to an amorphous solid, particularly in the region or zone adjacent the surface thereof, by physically implanting electrical conducting ions in the substrate. This is accomplished by molecularly exciting the amorphous substrate at a surface thereof to a molecularly plastic condition. This means that the solid is excited, as by heating, to cause relatively violent movement of the molecules so that the electrical conducting ions can be implanted in spaces between the molecules. The exciting of the amorphous solid is necessary because under ordinary conditions the solid is too hard and too resistant to implantation. Under the required degree of excitation, however, the ions can penetrate the molecular spaces.

Because penetration between the molecules is possible when the surface is excited, electrical conductivity can be imparted by the proper choice of ions and implanting them while the solid is in this excited state. Thus the invention is successful by making use of the diffusion properties of atoms or molecules to permit ion implantation.

The method of the present invention involves the molecular excitation of the substrate and/or the molecular excitation of the implanting material before it is applied to the substrate so that the material implants in the substrate, e.g., usually to a depth of about 1000 to 50,000 angstrom units, rather than forming merely a coating only on the surface. The substrate is a solid which can be either rigid or flexible, the term "solid" defining a physical state as opposed to "liquid" or "gaseous." Since heating is a convenient way of exciting the molecular structure, it is preferred procedure. Excitation can also be brought about by a laser beam, vibration and other effective means. Where the substrate is one which cannot be heated sufficiently for molecular excitation without destroying it, the molecular excitation can be applied to the implanting materials to cause the required implantation. For example, the materials can be excited and applied by spraying or by means of a plasma torch. The substrate is in its solid state at the time of application of the materials.

As seen in FIG. 1 the article can be a glass substrate 12 having an implantation at a substrate surface as indicated by stippling 14 in its surface 16. After implantation, electrodes 18 are applied in electrical contact with the implanted material for delivering a current through the implanted material. Where the substrate is transparent, e.g., glass, it is preferred that no interface exist between the implanted materials and the substrate so that good physical securement and low resistance electrical contact are provided between the electrode and conductive implant.

Compositions for forming the conductive implanting material include at least three ingredients: a carrier ingredient, an n-type impurity and a p-type impurity so that the substrate has both "hole" and electron conductivity. The use of both n-type and p-type impurities in the materials results in a product having a conductive character in which the energy states between its conductive band and valence band are generally filled or occupied. This permits the formation of implanted substrates of much lower resistance than previously possible so that less material need be used for a given resistance value. This is especially important where retention of good light transmissibility or uniformity of conductivity is deired in the substrate. The resistance values of the implanted substrates are usually measured as the value $R_s$ which is the resistance per square taken between two equal length parallel opposing electrodes in electrical contact with the implanted substrate throughout their lengths and spaced from each other a distance equal to their lengths. Additionally, the present materials are implanted within the substrate so that there is no interface to offset light transmission properties.

The implanting material is preferably applied as a solution although it can be melted and applied without requiring a solvent. Slurries or other fluidized solids can be used but the solid particles should be close to molecular size, e.g., colloidal in this case, to give a sufficiently high mobility of the particles for penetration into the substrate. Fluidized solids can be applied as ionized molecualr beams in a vacuum in the absence of substrate heating to obtain true ion implantation.

The carrier usually will be an inorganic compound of an element of Group III or Group IV of the Periodic Table. Some useful Group III and Group IV elements are germanium, halfnium, palladium, zirconum, titanium, silicon, aluminum, scandium, gallium, yttrium, indium, lanthanum, thallium, actinium and boron.

Group IV carriers are especially preferred because they are convertible to semi-conductors and retain optical transmissibility when implanted in the substrate. Inorganic compounds of elements of Group V, e.g., phosphorus, vanadium, arsenic, neodymium, antimony and bismuth, are also very useful as carriers. It is also possible to use inorganic compounds of other elements of the Periodic Table as carriers and impurities by selecting them with respect to their possible relative valence states. Such other elements include the rare earths. For example, Type 4f (the cerium series of elements of the rare earths 58 through 71) and Type 5f rare earths such as thorium provide good p-type impurities. Since the Periodic Table is commonly available, it is unnecessary to specifically list the elements of each group or other classification.

Compounds of elements of Groups I and II, where the element can have a valence higher than one, may be useful as carriers, but because they tend to migrate after implantation in high temperature use in an electric field the resistnce often will increase under such condition. The increase in resistance resuts in less current flow and less migration which eventually tends to stabilize the resistance at a higher value. Although this ability of increasing and then stabilizing resistance may be useful or acceptable in some applications where high temperature operation with generally constant resistance is desired, the Group I and II element compounds should not generally be used as carriers. Examples of Group I and II carrier compounds are $Cu_2O$, CdS, ZnO, $ZnFe_3O_z$, etc.

The n-type impurities are inorganic compounds of elements which can exist in a valence state higher than that of the carrier. The p-type impurities are inorganic compounds of elements which can exist in a valence state lower than that of the carrier. Each of the n-type and p-type impurities is present in the implanting composition in a small amount, usually about 0.01–5 weight percent and preferably about 0.05–1 weight percent based on the carrier. The n-type impurity is selected from a group of the Periodic Table higher than the group in which the carrier element falls and the p-type impurity is selected from a lower group than that of the carrier. For example, where the carrier is selected from Group IV, the n-type impurity will be selected from of the Groups V through VII, and the p-type impurity will be selected from Group II or III.

Depending upon the use to which the implanted substrate is to be put, care should be taken in selecting those elements for use as carriers and impurities that will achieve the characteristics most desired. For example, in compounding a composition to implant clear glass where transparency is desired, it has been found that indium in a sufficient amount to give the proper conductivity for use of the glass as a frost-free glass decreases light transmissibility by about 25%. On the other hand, where tin is used as the carrier, loss of light transmissibility is less than 10%, as low as only 2%, and usually only 4% or 5%.

The ingredients of the formulation, i.e., the carrier, n-type semi-conductor and p-type conductor, are usually in soluble form although the insoluble salts or even elements themselves can be used if ground to size approaching molecular or colloidal size or if melted. When used as a solution, the nature of the soluble form is unimportant so long as the desired element is present, although usually an oxide (including hydroxide) or halide, bromide, chloride, iodide or fluoride of the element is used. The oxide is preferred over the halide if the oxide is soluble. Besides halides and oxides or hydroxides, the elements can be present in the form of salts such as nitrates, sulphates, phosphates, etc., or even in acid form such as phosphoric or boric acid. Useful salt forms are well known to those in the semiconductor art and any such salt forms can be used in the present invention. Often the salt may convert to an oxidized form of the element implanted, especially where the implantation is carried out in an oxygen containing atmosphere at a temperature sufficiently high to cause such conversion.

Because of convenience in handling, it is preferred that the combination of salts in a particular solution formulation be soluble in a common solvent, although slurries are also useful. Care should be taken not to use an explosive solvent when operating at elevated temperatures in the presence of oxygen. Water is the preferred solvent because of its availability and non-flammability and because it can be easily evaporated without leaving any appreciable undesirable residue in the applied material. Where solutions are used and are sprayed on the substrate, they are preferably concentrated solutions even to the extent of being supersaturated and having some of the soluble material present as a slurry. Usually from 1 to 8 grams, preferably 2 to 4 grams, of carrier plus impurity mixture is used for each cc. of solvent. The solution can be filtered before use to remove any slurried solids but this is not necessary because slurries can also be used. Filtering has been found to result in higher $R_s$ of the resulting implant with a given amount of spray, apparently because the concentration of inorganic salts is decreased by removing the slurried solids.

FORMULATION EXAMPLES

The following examples of useful formulations are given by way of illustrations and are not intended to be limiting on the invention:

EXAMPLES A THROUGH EE

Each of these composition examples is prepared by blending or mixing crystals of the materials identified in the following table in amounts shown.

| Example | Carrier | Weight percent | Impurities n-Type | Weight percent | Impurities p-Type | Weight percent |
|---|---|---|---|---|---|---|
| A | $SnCl_2$ | 98.9 | $Sb_2O_3$<br>$CrCl_3$ | 0.5<br>0.05 | $AlCl_3$<br>$CuCl_2$ | 0.5<br>0.05 |
| B | $SnCl_2$ | 97.9 | $Sb_2O_3$<br>$CrCl_3$ | 1.0<br>0.05 | $AlCl_3$<br>$CuCl_2$ | 1.0<br>0.05 |
| C | $SnCl_2$ | 96.9 | $AsCl_3$<br>$CrCl_3$ | 1.5<br>0.05 | $InCl_3$<br>$CuCl_2$ | 1.5<br>0.05 |
| D | $SnCl_2$ | 98.9 | $H_3PO_4$<br>$V_2O_2$ | 0.5<br>0.1 | $H_3BO_3$ | 0.5 |
| E | $SnCl_2$ | 97.9 | $N_3PO_4$<br>$V_2O_2$ | 1.0<br>0.1 | $H_3BO_3$ | 1.0 |
| F | $SnCl_2$ | 98.95 | $P_2O_5$<br>$V_2O_2$ | 0.5<br>0.05 | $H_3BO_3$ | 0.5 |
| G | $SnCl_2$ | 97.95 | $P_2O_5$<br>$V_2O_2$ | 1.0<br>0.05 | $H_3BO_3$ | 1.0 |
| H | $SnCl_2$ | 96.95 | $P_2O_5$<br>$V_2O_2$ | 1.5<br>0.05 | $H_3BO_3$ | 1.5 |
| J | $SnCl_2$ | 96.95 | $P_2O_2$<br>$Th(NO_3)_4 \cdot 4H_2O$ | 1.5<br>0.05 | $H_3BO_3$ | 1.5 |
| K | $SnCl_2$ | 95.95 | $P_2O_5$<br>$V_2O_2$ | 2.0<br>0.05 | $H_3BO_3$ | 2.0 |
| L | $SnCl_2$ | 94.95 | $P_2O_5$<br>$V_2O_2$ | 2.5<br>0.05 | $H_3BO_3$ | 2.5 |
| M | $SnCl_2$ | 98.95 | $CrCl_3$ | 0.5 | $SrNO_3$<br>$CuCl_2$ [a] | 0.5<br>0.05 |
| N | $SnCl_2$ | 97.95 | $CrCl_3$ | 1.0 | $BaNO_3$<br>$CuCl_2$ [a] | 1.0<br>0.05 |
| P | $SnCl_2$ | 96.95 | $CrCl_3$ | 1.5 | $BaNO_3$<br>$CuCl_2$ [a] | 1.5<br>0.05 |
| Q | $SnCl_2$ | 98.9 | (b)<br>$CrCl_3$<br>$V_2O_2$ | 0.5<br>0.05<br>0.05 | $H_3BO_3$ | 0.5 |
| R | $SnCl_2$ | 97.9 | (b)<br>$CrCl_3$<br>$V_2O_2$ | 1.0<br>0.05<br>0.05 | $H_3BO_3$ | 1.0 |
| S | $SnCl_2$ | 96.9 | (b)<br>$CrCl_3$<br>$V_2O_2$ | 1.5<br>0.05<br>0.05 | $H_3BO_3$ | 1.5 |
| T | $SnCl_2$ | 98.9 | $TeCl_4$<br>$CrCl_3$ | 0.5<br>0.1 | $B_3NO_3$ | 0.5 |
| U | $TiCl_4$ | 97.9 | (b)<br>$CrCl_3$<br>$V_2O_2$ | 1.0<br>0.05<br>0.05 | $H_3BO_3$ | 1.0 |
| V | $ZnCl_2$ | 97.9 | (b)<br>$CrCl_3$<br>$V_2O_2$ | 1.0<br>0.05<br>0.05 | $H_3BO_3$ | 1.0 |
| W | $InCl_3$ | 98.0 | $SnCl_2$ | 1.0 | $CdCl_2$ | 1.0 |
| X | $SbCl_3$ | 98.0 | $CrCl_3$ | 1.0 | $TiCl_4$ | 1.0 |
| Y | $SbCl_3$ | 98.0 | $CrCl_3$ | 1.0 | $SnCl_2$ | 1.0 |
| Z | $TiCl_4$ | 96.9 | $AsCl_3$<br>$CrCl_3$ | 1.5<br>0.05 | $InCl_3$<br>$CuCl_2$ | 1.5<br>0.05 |
| AA | $SnCl_2$ | 99.0 | $MoOCl_4$ | 0.5 | $H_3BO_3$ | 0.5 |
| BB | $SnCl_2$ | 99.0 | $SeO_2$ | 0.5 | $H_3BO_3$ | 0.5 |
| CC | $SnCl_2$ | 99.0 | $P_2O_5$ | 0.5 | $CdCl_2$ | 0.5 |
| DD | $SnCl_2$ | 99.0 | $P_2O_5$ | 0.5 | $MgCl_2$ | 0.5 |
| EE | $SnCl_2$ | 99.0 | $P_2O_5$ | 0.5 | $ZnCl_2$ | 0.5 |

[a] Also functions to stabilize the solution.
[b] Phosphotungstic acid.

The above weight percentages are based on the composition as a whole.

In one method, the implanting material is prepared by mixing the selected compounds which are to provide the carrier and n- and p-type impurities. This can be done as a dry mix, a slurry, a solution or combinations thereof or the like. The substrate is heated to an elevated temperature sufficient to excite the molecules adjacent a surface and, while the excited substrate is still solid, the implanting material is applied at the surface. This can conveniently be done by spraying the material as a melted liquid, a fluidized solid, a slurry or a solution on the heated surface.

A convenient way of implanting the substrate is to move the substrate through a gap between a radiant quartz heat lamp and the implanting composition spray apparatus to heat the substrate from one side while spraying the substrate from the other. This is particularly advantageous where the substrate is flat and thin such as a sheet of glass. Temperatures used are below the destruction temperature of the substrate and where it is desired not to deform the substrate, below the deformation temperature of the substrate, e.g., in the case of glass 50 to 100° C. or more below the softening point or range. Where glass is used as the substrate, the surface is preferably heated to a temperature slightly beyond its annealing temperature to obtain tempering as an advantageous additional result. The implanting operation can be carried out in conjunction with normal glass annealing procedures.

In another form of the method, the substrate is placed in a kiln and heated to an excited implanting temperature. The kiln is opened and the heated surface is sprayed with the material by use of a hand spray gun or a spray gun mounted to move across the surface on tracks at the kiln opening. Usually the composition will be applied in a plurality of passes over the glass surface so as not to unduly cool the surface by impingement of the spray material thereon. After each pass, the kiln is reclosed until the substrate comes back up to temperature. Surface temperature can be taken with suitable thermocouples on the surface or surface temperature can be correlated with the temperature of the kiln internal atmosphere from previous experience.

The greater the amount of material implanted in a substrate the greater the conductivity thereof.

The present invention is especially useful in providing normally non-conducting substrates with an implanted conductive material. More particularly, the invention solves the problem of making a light transmitting glass substrate conductive without undesirable impairment of light transmission. Therefore, the invention is adaptable to the preparation of clear glass that can be heated by passage of an electric current and thus suitable as automobile frost-free windshields and frost-free transparent glass or plastic display counter walls or lids and the like.

According to a preferred method for producing implanted transparent glass, the glass is first heated at a surface to a temperature near its annealing temperature, e.g., within the range of 50° C. below annealing temperature to 50° C. above annealing temperature, and preferably above its annealing temperature but not above the elastic deformation limit of the glass. For example, where it is desired to implant a sheet or pane of soda lime glass having an annealing temperature of 548° C. according to this preferred method, the glass at a surface is heated to a temperature in the range of 520° C. to 580° C. The heated glass surface is then sprayed with a solution of the formulation to be used. Spraying is intermittent to permit the glass to come back to the proper temperature after cooling by spray contact. The heating can be conveniently carried out by placing the glass sheet on a heat resistant ceramic or asbestos support surface in a kiln. The support surface is preferably smooth so that sagging and peaks do not tend to form in the glass to distort its surfaces. I have found that applying the major amount of heat to the top exposed surface of the glass will result in heating the glass to an acceptable high temperature while keeping the bottom surface at a slightly lower temperature and the glass will not have as much tendency to sag. Below the elastic limit of the substrate (e.g. the glass sheet), high temperature produce greater molecular excitation of the molecules and result in better implantation with better clarity and lower $R_s$.

During spraying of the heated substrate, for example glass, according to the preferred method, the spraying is with a pressure gun delivering a concentrated fine mist under nitrogen pressure. The smaller the mist particle size, the better the implantation uniformity. When operating in a kiln, it is preferred that gases which may include both solvent vapor and gaseous reaction products from the formulation be vented from the kiln before reclosing the kiln and reheating the substrate to the desired temperature before the next spraying operation. This helps prevent fogginess or cloudiness developing in the substrate.

After the substrate is implanted electrodes are applied as by painting the electrodes on the implanted substrate. These permit applying a current through the implanted portions of the substrate. Silver paint for example gives good surface contact. When glass is the substrate it can be reheated below annealing temperature, e.g. to 450–475° C. to better conform the silver and glass surface and give better electrical contact.

Usually the implanted material will vary in particle concentration approximately logarithmically with depth as schematically shown by the stippling 14 in FIG. 1.

The implanting according to this invention can provide a completely subsurface conductive zone covered with an insulating zone of the substrate. This may be accomplished by providing a substantially constant spray force of the fluid implanting material to give a generally constant depth of implantation. Also thicker bands of material can be provided by a wider variance in spray force. The thicker bands, of course, decrease light transmissibility somewhat.

METHOD EXAMPLES

Examples of the methods of implanting are given below. These examples are for the purpose of illustrating the various methods and are not intended as limiting the invention.

Examples 1 through 17

Referring to the table, in each of the following examples a 14" by 20" or 12" by 18" sheet or plate glass substrate was supported in a kiln on a ceramic support surface and heated to the anneal temperature identified. The heated surface was intermittently sprayed with the amount of the spray identified and under a spray gun of 60 p.s.i. with the spray solution at ambient temperature. The spraying was with a manual spray gun operating under nitrogen pressure with intermittent passes over the surface of about 5 seconds duration. The number of passes is recorded for most examples. The surface was reheated to annealing temperature between each pass which required only a couple of minutes with the kiln closed. After spraying was completed, the implanted substrate was annealed for the time indicated. The $R_s$ was measured and is recorded in the table. The appearance of the substrate and any warpage was noted and is also recorded in the table.

SPRAY

| Ex. No. | Solution: Formulation | Solution: Dilution | Annealing: Time, hrs. | Annealing: Temp., ° C. | Surface resistance, $R_s$ ohms, mean average of plural tests | Appearance | Warpage |
|---|---|---|---|---|---|---|---|
| 1 [1] | R | 8 gm. in 4 cc. $H_2O$ | 2¼ | 520 | ~350 | Slightly pitted | No. |
| 2 [1] | S | do | 1 | 550 | ~200 | Greenish, good clarity | Yes. |
| 3 [1] | S | do | 2½ | 550 | [7] ~50K | Clear | No. |
| 4 [1] | S | do | 2½ | 570 | ~85 | Cloudy | No. |
| 5 [3] | S | do | 2 | 520 | ~600 | Slightly cloudy | No. |
| 6 [1] | S | do | Overnight | 520 | ~110 | Pitted | No. |
| 7 [1] | S [4, 6] | do | 2 | 520 | ~45 | Glass has good clarity but with speckling. | No. |
| 8 [1] | S [4, 5] | 8 gm. in 2 cc. $H_2O$ | 2 | 520 | ~650 | Good clarity [8] | No. |
| 9 [1] | S [5] | 8 gm. in 4 cc. $H_2O$ | All night | 550 | ~220 | Speckled | No. |
| 10 [1] | S [5] | 8 gm. in 1 cc. $H_2O$ | None | 550 | ~450 | Rainbow | No. |
| 11 [2] | S [5] | 8 gm. in 4 cc. $H_2O$ | 2½ | 550 | ~1.5K | Clear | No. |
| 12 [1] | S [5] | 16 gm. in 8 cc. $H_2O$ | 2½ | 550 | ~350 | Light cloudy | No. |
| 13 [1] | S [5] | do | 2½ | 550 | ~85 | do | No. |
| 14 [1] | S [5] | do | 2½ | 550 | ~125 | Very fine cloudy | No. |
| 15 [1] | S [6] | do | None | 550 | ~400 | Cloudy | No. |
| 16 [1] | S [5] | do | 2½ | 550 | ~425 | do | No. |
| 17 [2] | S [5] | do | 3 | 500 | ~700 | do | No. |

[1] Window glass pane.
[2] Automobile window glass.
[3] Plate glass.
[4] Preheated before sprayed.
[5] Filtered before sprayed.
[6] More than about 5 seconds per scan; smoke emitted from kiln after each scan.
[7] Individual test values averaged from 1K to 100K.
[8] After washing with solvent.

In each of Examples 1–17 the solution (dispersion) was aged 1 to 2 hours before use.

Where the formulation is described as a ratio dilution formulation, it is the ratio of grams formulation to cc. water, for example a 3:1 dilution is 3 grams formulation diluted with 1 cc. water. In each of the examples below, the spraying was by intermittent scanning with an ambient temperature spray, as described above, followed by reheating the substrate.

EXAMPLE 18

Four glass squares of different composition were obtained from Corning Glass Works under the tradenames Alpha Light Pattern No. 55, Pyrex Flat Glass Pattern No. 12, Fota-Lite and Crystal Lite Pattern No. 63. Each was placed in the kiln and the Pyrex glass heated to 625° C. and the other three to 525–550° C. After reaching temperature, each glass surface was sprayed with a 3:1 dilution of Formulation D under 30 p.s.i. spray pressure. The coated Fota-Lite glass had an $R_s$ of about 100,000 ohms while the other glasses had a much lower $R_s$ of about 800 to 1,000 ohms.

EXAMPLE 19

A glass relish tray was placed on a support surface in the kiln upside down so as to expose the bottom of the tray. The tray bottom was heated to about 500° C. and was sprayed with a 3:1 dilution of Formulation D prepared 1 hour previously. The spraying was carried out with three intermittent passes of the spray gun over the tray bottom. After annealing for about 30 minutes at 500° C. the tray at the bottom surface was found to have an $R_s$ of above 3,000 ohms. The resistance was taken across a marked distance on the bottom of the tray and was found to be 8,000 ohms. The tray was then replaced in the kiln and heated to 550° C. and after recovering and cooling the resistance across this marked distance was found to have increased to 14,000 ohms.

EXAMPLE 20

A 3:1 dilution of Formulation T was used in a series of three tests. A Pyrex glass cover was placed in a kiln and heated to 650° C. and manually sprayed with the above D solution from a spray gun with 2, 4 and 6 intermittent passes of the spray respectively. The $R_s$'s of the implanted substrates were 400, 1,000 and 3,000 ohms respectively, and each was clear in appearance.

EXAMPLE 21

A Pyroceram dish was heated in the kiln to 625° C. and sprayed using 5 intermittent passes of the 3:1 dilution Formulation T spray. The implanted sections had an $R_s$ of about 1,000 ohms. The dish had turned yellow while in the oven but when it was cooled to room temperature returned to its original color and had good clarity. This procedure was repeated using a second Pyroceram dish at 700° C. and a spray composed of a mixture of 4 parts Formulation A and 1 part water. An $R_s$ of about 300 ohms was obtained. Two weeks later, this second implanted dish was again treated at 700° C. but with 5 intermittent spray passes over the previously sprayed areas, using a 3:1 dilution of Formulation H. An $R_s$ of about 75 ohms was obtained. This showed that previously implanted articles can be effectively reimplanted to give lower resistance.

EXAMPLE 22

This method was also used to treat Pyroceram saucers with 5 intermittent passes of a 3:1 dilution of Formulation A at a saucer surface temperature of 700° C. and an $R_s$ of about 350 ohms was obtained with no appreciable discoloration.

EXAMPLE 23

A one quart enamel pan (steel with frit coating) was placed upside down in the kiln, heated to 600° C. surface temperature and the pan bottom was sprayed with 5 intermittent passes of the 3:1 dilution of Formulation A. The sprayed bottom had an $R_s$ of about 150 ohms. A pair of electrodes 20 and 22, as seen in FIG. 2, were applied to the bottom of the pan by painting with conductive silver paint. The resistance across the electrodes was about 21 ohms and when 120 volts AC was applied across the electrodes a current flow of 5.5 amps was created. 600 ccs. of 180° C. water was placed in the pan and within 4 minutes was boiling.

EXAMPLE 24

Beige and white speckled ceramic tiles were heated in the kiln to 700° C. and sprayed with 5 intermittent passes of the 3:1 dilution of Formulation A. The tiles were 4" x 4" squares. As seen in FIG. 7, separate silver electrodes 32 and 34 were painted along two opposing edges of each tile in electrical contact with the sprayed areas and the total resistance across the tile was measured. The beige tile had a resistance of 600 ohms and the white speckled tile had a resistance of 1,500 ohms.

EXAMPLE 25

Each of three Pyrex glass covers was heated to a little over 600° C. and was sprayed with 5 passes of 3:1 dilution of different formulations. The formulation for the first cover was F, for the second G, and for the third H. The $R_s$ values for the resulting implanted covers were 1,000 ohms, 1,500 ohms and 100 ohms, respectively.

EXAMPLE 26

A Pyrex glass cover was supported peripherally and an open flame was directed against its inner surface until the outer surface reached a temperature of about 575° C. The outer surface was then sprayed with 5 intermittent passes of the 3:1 dilution of Formulation H. After cooling, the $R_s$ of the sprayed surface was about 35 ohms.

EXAMPLE 27

A square sample of a particular glass was found to deform at 575° C. Additional square samples of the glass were heated to 500° C., 525° C. and 550° C., respectively, and sprayed with 3:1 dilution of Formulation L. After recovering the glass samples from the kiln, the $R_s$'s of the samples were found to be 1500 ohms, 1000 to 1500 ohms, and 800 to 3000 ohms, respectively. The 550° C. square was tested on a Foote Lambert meter and found to give a reading of 84 units while the untreated glass gave a reading of 92 to 93 units. The spraying was repeated at a temperature of 540° C. with 7 passes of the formulation over the glass surface. When tested on the Foote Lambert meter, a reading of 89 was obtained. The $R_s$ varied over the surface between 500 ohms and 3000 ohms.

EXAMPLE 28

In certain instances, flushing the glass or other substrate surface with nitrogen or other inert gas between spray passes appeared to improve the clarity of the sprayed surface. Accordingly, a 14" x 20" sheet of soda glass was placed on a support surface in the kiln and heated to a surface temperature of 550° C. 2 parts of Formulation Q were mixed with 1 part of water and about 5 minutes after mixing the mixture was sprayed in 5 intermittent passes over the glass surface. The surface and the kiln was flushed with nitrogen for 1 minute. The sprayed glass recovered from the kiln had very good light transmissibility and very good color and clarity. The $R_s$ varied from 200 to 500 ohms over the surface of the glass. A glass sheet similarly coated but without nitrogen flushing had slightly less light transmissibility and clarity.

EXAMPLE 29

In another example, a Pyrex serving platter was placed top down on the support surface of the kiln and was heated until its bottom surface reached a temperature of about 575° C. The surface was then sprayed with two passes of the 3:1 dilution of Formulation H. The tray was permitted to cool and was removed from the kiln. The sprayed surface was masked with graphite dust over an area at one end as indicated by the light stippling 42 in FIG. 8. The tray was replaced in the oven, reheated to about 575° C. and sprayed with two more passes of formulation. The tray was permitted to cool and again recovered and masked in the areas indicated by the light and medium stippling at 42 and 44 in FIG. 8. The reheating and spraying with two more passes was repeated. The product was recovered and the graphite dust was wiped off. Electrodes 48 and 50 were painted on the bottom of the tray with silver paint in electrical contact with the sprayed surface. Lead cord 52 was attached and the entire bottom of the tray was coated with electrically insulating plastic as shown at 54. It was found that when a current was placed across the electrodes, the serving tray was heated to a high temperature (about 300° F.) in area 46, a low temperature (about 100° F.) in area 42, and an intermediate temperature (about 200° F.) in area 44. The $R_s$'s were measured in each area and were found to be about 200, 125 and 50 ohms for areas 42, 44 and 46, respectively.

Other coatings of formulations at the dilutions identified in Table III below are applied as plural passes of 3:1 dilution to various substrates at surface temperatures indicated to obtain surfaces having $R_s$ values in the range of 500 to 20,000 ohms.

TABLE III

| | Substrate | Surface temperature, ° C. |
|---|---|---|
| Formulation: | | |
| J | Soda glass | 525 |
| K | do | 525 |
| M | do | 525 |
| N | do | 560 |
| P | do | 560 |
| A | Concrete block | 700 |
| | Cinder block | 700 |
| | Marble | 550–600 |

In my experiments with the present method using formulation solutions or colloidal suspensions, it has been found that these solutions vary greatly with respect to shelf life. It has been noted that on storage some of the solutions will form precipitates so that a true solution no longer exists. This can result, for example, by chemical reaction of the salts with each other. It is possible to stabilize the solutions, e.g., see the stabilizer noted in Formulations M, N and P, but this need not present a problem since the solutions can easily be prepared shortly before use, e.g., a few minutes to a few hours before use.

A variance noted in some instances was the variance of $R_s$ over the surface of a given sample and the variance in color of the slight tint that often appears on the treated areas of a clear glass. The color of the tint appears to be correlated to at least some extent with $R_s$, since lower $R_s$ values are often obtained in an area of one color than are obtained in an area of another color. Apparently the variance in the color with $R_s$ is because of different implanted thicknesses or depths obtained, or uneven application over the surface. I have observed yellowish, greenish, bluish, reddish and other tints on clear glass surfaces treated in accordance herewith and when observed under a microscope some of the colored areas have minute islands of other colors within the colored areas, e.g., islands of red in yellow or green, blue in red, or the like. Yellowish or gold tint is usually associated with high $R_s$ and green with low $R_s$, although I have observed green tints to also accompany high $R_s$.

Because of the possibility of uneven application of material, a mechanized system was set up consisting of a carriage traveling across the top of the kiln. The spray gun was mounted on the carriage to direct the spray into the kiln and the carriage was uniformly moved across the kiln at a constant rate during each spray pass. With this system, a number of pieces of glass were sprayed with various formulations and were found to have a somewhat more uniform $R_s$ than with manual spraying.

Still more uniform results can be obtained by more precise control of the spray being applied. Accordingly, a sheet of glass was fed over a quartz radiant heater equipped with an elliptical reflector to heat the glass surface from the reverse side, providing a narrow band of heated glass at the quartz heater as the glass was moved lengthwise over the quartz heater. The spray was applied to the heated band of surface material in the form of a narrow spray band extending across the width of the glass. The spray was approximately opposite the heater with the glass traveling therebetween. Precise control of the spray gave a good uniform application.

One very important advantage of the present invention is that treated sheets of glass can be annealed after tempering. Usually during the implanting process, the glass surface becomes tempered to some degree because of the cooling effect of the fluid. Tempering the glass causes increased hardness and brittleness which can make the glass extremely difficult to cut without shattering. It has been found that in the examples reported above where a post-annealing step was carried out, the temper at the glass surface was eliminated or at least diminished to the extent that the coated glass could be easily cut.

Another very important advantage is that surfaces can be prepared having very low $R_s$'s, e.g., below 1000 ohms and even below 100 ohms down to a few ohms.

All parts and percents given herein are by weight unless otherwise indicated.

The foregoing detailed description is given for clearness of understanding only and no unnecessary limitations are to be understood therefrom.

I claim:

1. The method of imparting electrical conductivity to an amorphous, normally non-conducting, thermally plasticizable, solid substrate by ion implantation, comprising: molecularly exciting said substrate at a surface thereof to a molecularly plastic condition, and applying to said substrate while in said plastic condition a fluid composition containing inorganic electrically conducting particles of colloidal size and smaller, with the result that said particles penetrate said plastic substrate between the molecules thereof and impart electrical conductivity to said substrate, which conductivity is retained when the exciting of said solid substrate ceases, said fluid composition comprising a carrier solid that is an inorganic composition of an element of one of Groups III, IV and V of the Periodic Table, an n-type impurity inorganic compound of an element that can exist in a valence state higher than that of the carrier element, and a p-type impurity inorganic compound of an element that can exist in a valence state lower than that of the carrier element.

2. The method of claim 1 wherein said n-type impurity element is selected from a Periodic Table Group higher than that of the carrier element and the p-type impurity element is selected from a Periodic Table Group lower than that of the carrier element.

3. The method of claim 2 wherein said carrier element is from Group IV, said n-type impurity element is from Groups V through VII and said p-type impurity element is from Groups II and III.

4. The method of claim 1 wherein said n-type and p-type impurities are each present in said composition in an amount of about 0.01–5 weight percent of said carrier.

5. The method of claim 1 wherein said fluid composition is in solution form, said solution form including a true solution and a colloidal suspension.

6. The method of claim 1 wherein said composition is a water solution and the carrier and n-type and p-type impurities are water soluble and substantially completely dissolved in said water.

7. The method of claim 7 wherein said carrier and impurities are dissolved in said water and the solution aged prior to application to said surface.

8. The method of claim 1 wherein said substrate is glass and said exciting is by heating to a temperature about 50–100° C. below the softening point of the glass.

9. The method of claim 1 wherein said exciting is by heating said substrate, said composition or both.

10. The method of claim 1 wherein said carrier element is $SnCl_2$, said n-type impurity element is Phosphotungstic Acid, $CrCl_3$, and $V_2O_2$, and said p-type impurity element is $H_3BO_3$.

11. The method of claim 1 wherein said carrier element is $SnCl_2$, said n-type impurity is $TeCl_4$ and $CrCl_3$ and said p-type impurity is $B_9NO_3$.

12. The method of claim 1 wherein said carrier element is $TiCl_4$, said n-type impurity is $CrCl_3$ and $V_2O_2$ and said p-type impurity is $H_3BO_3$.

13. The method of claim 1 wherein said carrier element is $TiCl_4$, said n-type impurity is $AsCl_3$ and $CrCl_3$ and said p-type impurity is $InCl_3$ and $CuCl_2$.

14. The method of claim 1 wherein said carrier element is $SnCl_2$, said n-type impurity is $P_2O_5$ and said p-type impurity is $ZnCl_2$.

15. An electrically conductive solid substrate prepared by the method of claim 1.

References Cited

UNITED STATES PATENTS

| | | | |
|---|---|---|---|
| 2,564,706 | 8/1951 | Mochel | 117—211 |
| 2,617,741 | 11/1952 | Lytle | 117—211 |
| 3,402,072 | 9/1968 | Dreyfus | 117—211 |

DOUGLAS J. DRUMMOND, Primary Examiner

U.S. Cl. X.R.

117—213, 229; 252—518